US012243475B2

(12) United States Patent
Lee et al.

(10) Patent No.: US 12,243,475 B2
(45) Date of Patent: Mar. 4, 2025

(54) DISPLAY APPARATUS AND CONTROLLING METHOD THEREOF

(71) Applicant: SAMSUNG ELECTRONICS CO., LTD., Suwon-si (KR)

(72) Inventors: Hwasun Lee, Suwon-si (KR); Doyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/526,892

(22) Filed: Dec. 1, 2023

(65) Prior Publication Data

US 2024/0212585 A1 Jun. 27, 2024

Related U.S. Application Data

(63) Continuation of application No. PCT/KR2023/015224, filed on Oct. 4, 2023.

(30) Foreign Application Priority Data

Dec. 23, 2022 (KR) ........................ 10-2022-0183166

(51) Int. Cl.
*G09G 3/32* (2016.01)
*G09G 3/34* (2006.01)

(52) U.S. Cl.
CPC ............ *G09G 3/32* (2013.01); *G09G 3/3406* (2013.01); *G09G 2300/0452* (2013.01); *G09G 2320/062* (2013.01); *G09G 2354/00* (2013.01)

(58) Field of Classification Search
CPC .................. G09G 3/32; G09G 3/3406; G09G 2300/0452; G09G 2320/062; G09G 2354/00
See application file for complete search history.

(56) References Cited

U.S. PATENT DOCUMENTS 8,785,396 B2 * 7/2014 Leone-Bay .............. A61P 9/00 514/21.1
9,213,405 B2 12/2015 Perez et al.
(Continued)

FOREIGN PATENT DOCUMENTS

CN 110728637 A 1/2020
KR 10-2013-0130740 A 12/2013
(Continued)

OTHER PUBLICATIONS

International Search Report dated Jan. 24, 2024 issued by the International Searching Authority in International Application No. PCT/KR2023/015224.
(Continued)

*Primary Examiner* — Mihir K Rayan
(74) *Attorney, Agent, or Firm* — Sughrue Mion, PLLC

(57) ABSTRACT

Disclosed is a display apparatus. The display apparatus includes an input interface, a display panel, at least one memory configured to store instructions, and at least one processor configured to execute the instructions to identify an object included in an image corresponding to the image signal, adjust a dimming value of an area of the display panel corresponding to the object so that a brightness of the object is increased, and control the display panel to display the image based on the adjusted dimming value.

17 Claims, 10 Drawing Sheets

(56) References Cited

U.S. PATENT DOCUMENTS

| | | | | |
|---|---|---|---|---|
| 9,275,571 | B2 * | 3/2016 | Purdy | G09G 3/3208 |
| 9,520,075 | B2 | 12/2016 | Cho et al. | |
| 9,542,405 | B2 | 1/2017 | Park et al. | |
| 10,360,847 | B2 | 7/2019 | Lee et al. | |
| 10,950,189 | B2 | 3/2021 | Park | |
| 11,587,516 | B2 | 2/2023 | Kang | |
| 2005/0093850 | A1 * | 5/2005 | Mori | G09G 3/007 345/204 |
| 2007/0091111 | A1 * | 4/2007 | Gutta | H04N 9/73 345/591 |
| 2010/0165000 | A1 * | 7/2010 | Seuntiens | H04N 9/73 345/690 |
| 2012/0154466 | A1 * | 6/2012 | Kitada | G09G 3/342 345/694 |
| 2012/0154557 | A1 | 6/2012 | Perez et al. | |
| 2013/0324200 | A1 * | 12/2013 | Okamura | A63F 13/58 463/43 |
| 2014/0285477 | A1 | 9/2014 | Cho et al. | |
| 2017/0011692 | A1 * | 1/2017 | Lee | G09G 3/3233 |
| 2020/0184905 | A1 * | 6/2020 | Park | G09G 3/342 |
| 2021/0233248 | A1 | 7/2021 | Li et al. | |
| 2022/0139345 | A1 * | 5/2022 | Kang | G09G 3/3426 345/694 |
| 2023/0154423 | A1 | 5/2023 | Kang | |
| 2023/0164442 | A1 | 5/2023 | Kim | |

FOREIGN PATENT DOCUMENTS

| | | | |
|---|---|---|---|
| KR | 10-2014-0116607 | A | 10/2014 |
| KR | 10-2016-0019341 | A | 2/2016 |
| KR | 10-2017-0006969 | A | 1/2017 |
| KR | 10-1920647 | B1 | 11/2018 |
| KR | 10-2015954 | B1 | 8/2019 |
| KR | 10-2020-0068321 | A | 6/2020 |
| KR | 10-2020-0108760 | A | 9/2020 |
| KR | 10-2022-0006753 | A | 1/2022 |
| KR | 10-2022-0052705 | A | 4/2022 |
| KR | 10-2022-0058369 | A | 5/2022 |
| KR | 10-2403242 | B1 | 5/2022 |

OTHER PUBLICATIONS

Written Opinion dated Jan. 24, 2024 issued by the International Searching Authority in International Application No. PCT/KR2023/015224.

* cited by examiner

DISPLAY APPARATUS AND CONTROLLING METHOD THEREOF

CROSS-REFERENCE TO RELATED APPLICATION(S)

This application is a bypass continuation of International Application No. PCT/KR2023/015224, filed on Oct. 4, 2023, which is based on and claims priority to Korean Patent Application No. 10-2022-0183166, filed on Dec. 23, 2022, in the Korean Intellectual Property Office, the disclosures of which are incorporated by reference herein in their entireties.

BACKGROUND

1. Field

The disclosure relates to a display apparatus and a controlling method thereof and, more particularly to, a display apparatus that provides an improved image quality by analyzing an image, and a controlling method thereof.

2. Description of the Related Art

High Dynamic Range (HDR) content can be seen as if the content is recognized by the human eyes as compared to conventional Standard Dynamic Range (SDR) content. In particular, the HDR content includes a signal of a bright part and a dark part in a more precise manner. The importance of the dimming technology applied to a display apparatus is increased to correspond to the HDR content.

In the case of a display apparatus providing HDR driving, an image quality mode for maximizing a contrast ratio is merely provided. However, unlike content such as movies or drama where emphasizing a contrast ratio is important according to the intention of a content producer, in the case of gaming content which should react with a user in real time, an image quality improvement function capable of emphasizing a specific object in the image may be required according to a game progress situation.

SUMMARY

According to an aspect of the disclosure, a display apparatus includes: an input interface configured to receive an image signal; a display panel; at least one memory configured to store instructions; and at least one processor configured to execute the instructions to: identify an object included in an image corresponding to the image signal, adjust a dimming value of an area of the display panel corresponding to the object so that a brightness of the object is increased, and control the display panel to display the image based on the adjusted dimming value.

The at least one processor may include a neural processing unit (NPU) and may be further configured to identify the object on the image by using the NPU.

The at least one processor may be further configured to execute the instructions to adjust a dimming value of the area of the display panel corresponding to the remaining area so that a brightness of a remaining area other than the object in the image is decreased.

The display apparatus may include an ambient light generator configured to generate ambient light to light up a periphery of the display apparatus, wherein the at least one processor may be further configured to execute the instructions to, based on identifying the object, control the ambient light generator to generate the ambient light.

The ambient light generator may include a red light emitting diode (LED), a green LED, and a blue LED, and may be disposed on a rear surface or a side surface of the display apparatus, wherein the at least one processor may be further configured to execute the instructions to, based on identifying the object, control the red LED, the green LED, and the blue LED so that an ambient light of a preset color flickers.

The display apparatus may include an ambient light generator configured to generate ambient light to light up a periphery of the display apparatus; and a user interface configured to receive a user command to set an operation mode of the display apparatus, wherein the at least one processor may be further configured to execute the instructions to: based on an operation mode of the display apparatus being set to a first operation mode through the user interface, adjust a dimming value of the area of the display panel corresponding to the object so that the brightness of the object is increased, based on an operation mode of the display apparatus being set to a second operation mode through the user interface, adjust the dimming value of the area of the display panel corresponding to the object so that the brightness of the object is increased, and adjust a dimming value of an area of the display panel corresponding to a remaining area so that a brightness of the remaining area other than the object in the image is decreased, based on an operation mode of the display apparatus being set to a third operation mode through the user interface, adjust the dimming value of the area of the display panel corresponding to the object so that the brightness of the object is increased, and adjust the dimming value of the area of the display panel corresponding to the remaining area so that the brightness of the remaining area other than the object in the image is decreased, and control the ambient light generator to generate the ambient light in response to identification of the object.

The image may be a game image, and wherein the object may be a person included in the game image.

The display apparatus may include a backlight unit including a plurality of backlight blocks configured to illuminate the display panel with light, wherein the at least one processor may be further configured to execute the instructions to adjust a dimming value of a backlight block corresponding to an area of the display panel on which the object is to be displayed among the plurality of backlight blocks so that the brightness of the object is increased.

Each subpixel of the display panel may include a self-emissive element, and wherein the at least one processor may be further configured to execute the instructions to adjust a dimming value of self-emissive elements corresponding to the area of the display panel on which the object is to be displayed so that the brightness of the object is increased.

According to an aspect of the disclosure, a controlling method of a display apparatus includes: identifying an object included in an image corresponding to an input image signal; adjusting a diming value of an area of the display panel corresponding to the object so that a brightness of the object is increased; and displaying the image on the display panel based on the adjusted dimming value.

The display apparatus may include a neural processing unit (NPU) and wherein the identifying may include identifying the object on the image by using the NPU.

The method may further include adjusting a dimming value of the area of the display panel corresponding to the remaining area so that a brightness of a remaining area other than the object in the image is decreased.

The method may further include based on identifying the object, generating ambient light to light up periphery of the display apparatus.

The display apparatus may include a red light emitting diode (LED), a green LED, and a blue LED, and the red LED, the green LED, and the blue LED are disposed on a rear surface or a side surface of the display apparatus, wherein the generating the ambient light may include: based on identifying the object, controlling the red LED, the green LED, and the blue LED so that an ambient light of a preset color flickers.

According to an aspect of the disclosure, a non-transitory computer readable medium storing computer instructions to cause the display apparatus to perform, when executed by a processor of the display apparatus, operations includes: identifying an object included in an image corresponding to an input image signal; adjusting a diming value of an area of the display panel corresponding to the object so that brightness of the object is increased; and displaying the image on the display panel based on the adjusted dimming value.

According to an aspect of the disclosure, a display apparatus includes: at least one memory configured to store instructions; at least one processor configured to execute the instructions to: identify an object included in an image corresponding to an image signal, adjust a diming value of an area of the display panel corresponding to the object so that a brightness of the object is increased, and control a display panel to display the image based on the adjusted dimming value.

The at least one processor may include a neural processing unit (NPU) and may be further configured to execute the instructions to identify the object on the image by using the NPU.

The at least one processor may be further configured to execute the instructions to adjust a dimming value of the area of the display panel corresponding to the remaining area so that a brightness of a remaining area other than the object in the image is decreased.

The display apparatus may further include an ambient light generator configured to generate ambient light to light up a periphery of the display apparatus, wherein the at least one processor may be further configured to execute the instructions to, based on identifying the object, control the ambient light generator to generate the ambient light.

The ambient light generator may include a red light emitting diode (LED), a green LED, and a blue LED, and may be disposed on a rear surface or a side surface of the display apparatus, wherein the at least one processor may be further configured to execute the instructions to, based on identifying the object, control the red LED, the green LED, and the blue LED so that an ambient light of a preset color flickers.

BRIEF DESCRIPTION OF DRAWINGS

The above and other aspects, features, and advantages of embodiments of the disclosure will be more apparent from the following description taken in conjunction with the accompanying drawings, in which.

DETAILED DESCRIPTION

Figure 1:
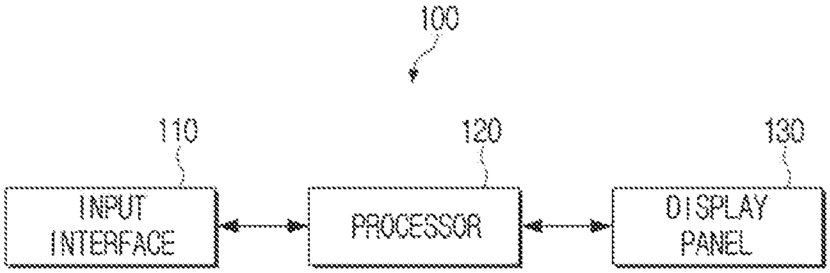
FIG. 1 is a block diagram of a display apparatus according to one or more embodiments of the disclosure.

Below, various examples of the disclosure will be described in detail with reference to the accompanying drawings. It will be understood, however, that it is not intended to limit the techniques described herein to specific examples, but may include various modifications, equivalents, and/or alternatives of the examples of the techniques described herein. In the context of the description of the drawings, identical, similar reference numerals may be used for like and similar elements.

In describing the disclosure, detailed descriptions of related art techniques are omitted when it is determined that the disclosure may unnecessarily obscure the gist of the disclosure. In addition, the description of the same configuration of the disclosure will be omitted.

The suffix "part" for a component used in the description of the disclosure is added or used in consideration of the convenience of the specification, and it is not intended to have a meaning or role that is distinct from each other.

The terminology used in this disclosure is used to describe an embodiment, and is not intended to restrict and/or limit the disclosure. A singular expression includes a plural expression, unless otherwise specified.

It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

As used herein, the terms "first," "second," or the like may denote various components, regardless of order and/or importance, and may be used to distinguish one component from another, and does not limit the components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Unless otherwise defined, all terms used herein have the same meaning as commonly understood by one of ordinary skill in the art to which this disclosure belongs.

Hereinafter, various embodiments of the disclosure will be described in detail with reference to the accompanying drawings.

FIG. 1 is a block diagram of a display apparatus according to one or more embodiments of the disclosure. Referring to FIG. 1, a display apparatus 100 includes an input interface 110, a processor 120, and a display panel 130.

The display apparatus 100 may include a smart TV, an Internet TV, a web TV, an Internet Protocol Television (IPTV), signage, monitor, or the like, but is not limited thereto, and may be implemented as various types of apparatuses including a display function, such as a smartphone, a tablet, a large format display (LFD), a digital signage, digital information display (DID), video wall, projector display, or the like.

The input interface 110 may receive an image signal from the outside. For example, the input interface 110 may receive an image signal from personal computer (PC) or set-top box, or the like, and transmit the signal to the processor 120. For this, the input interface 110 may be implemented with high definition multimedia interface (HDMI) or display port (DP), but is not limited thereto.

The display panel 130 may display various images by the control of the processor 120. The display panel 130 may include a plurality of pixels, and each pixel may include a plurality of subpixels. For example, each pixel may be composed of three subpixels corresponding to a plurality of lights, for example, red, green, and blue lights (R, G, and B). However, embodiments are not limited thereto, and in some cases, cyan, magenta, yellow, black, or other subpixels may be included, in addition to R, G, and B subpixels.

In the meantime, the display panel 130 may be implemented with a liquid crystal display (LCD), but is not limited thereto, and each subpixel may be implemented with an organic light emitting diode (OLED) panel in which each sub-pixel is made of an organic light emitting diode, and a light emitting diode (LED) composed of inorganic light emitting diodes. At this time, an LED panel may include a mini LED panel according to sizes of an inorganic light emitting element constituting a sub-pixel, a micro LED panel, or the like.

The processor 120 controls the overall operation of the display apparatus 100. The processor 120 may include at least one processor 120. For example, the processor 120 may include one or more various processors such as a central processing unit (CPU), a neural processing unit (NPU), a graphic processing unit (GPU), a digital signal processor (DSP), a micro-processor, an application processor (AP), a communication processor (CP), an advanced RISC machine processor (ARM processor), a micro controller unit (MCU), a micro processing unit (MPU), a controller, and the like.

The processor 120 may be implemented with a system on chip (SoC), large scale integration (LSI) in which various processing algorithms are embedded, or implemented with a field programmable gate array (FPGA). The processor 120 may perform various functions by executing computer executable instructions stored in a memory (not shown).

The processor 120 may identify an object included in an image. To be specific, the processor 120 may identify a specific object included in an image corresponding to an image signal input through the input interface 110. For example, the processor 120 may identify a particular object, such as a person, within an image using a histogram of oriented gradients (HOG). The method using the HOG is to identify an object by extracting a gradient distribution characteristic of an object in an image, here, by accumulating HOG data, and using support vector machines (SVM) trained according to the data, various objects may be detected in the image. However, embodiments are not limited thereto, and the processor 120 may identify an object in the image by using various other methods.

In addition, the processor 120 may increase the brightness of the identified specific object. According to one or more embodiments of the disclosure, the processor 120 may adjust a dimming value for an area of the display panel 130 corresponding to a specific object so that the brightness of the identified specific object increases, and may display an image on the display panel 130 based on the adjusted dimming value.

According to one or more embodiments of the disclosure, the display apparatus 100 may emphasize a corresponding object by increasing the brightness of a specific object in an image. By emphasizing a specific object in the image, a sense of engagement may be provided to a user who uses the gaming content through the display apparatus 100.

According to one or more embodiments, in order to further emphasize a specific object, the processor 120 may adjust a diming value of an area of the display panel 130 corresponding to a remaining area so that brightness of a remaining area other than the specific object is decreased in an image.

When brightness is decreased by adjusting a dimming value of a remaining area, a specific object of which brightness is increased may be further emphasized.

In addition, according to one or more embodiments, the processor 120 may generate ambient light that lights the periphery of the display apparatus 100 in response to the identification of a specific object in the image. The provided ambient light may call attention of a user using a gaming content so, convenience of using the gaming content may be further increased.

Figure 2:
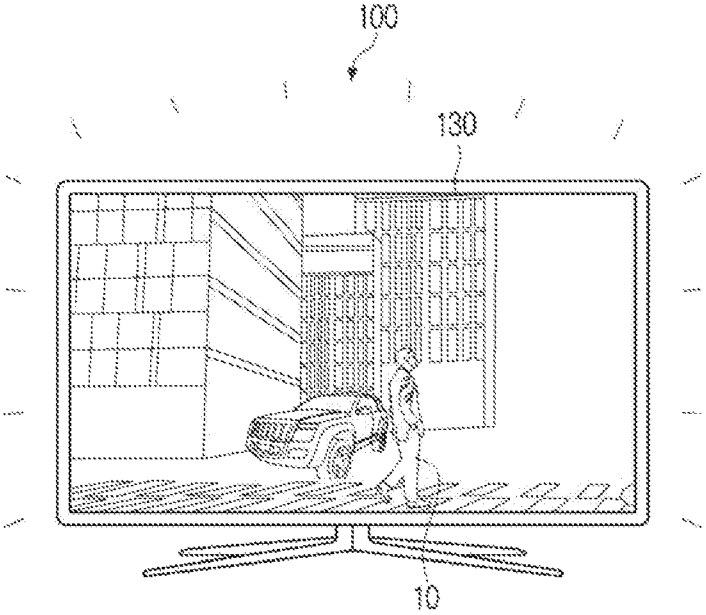
FIG. 2 is a diagram illustrating an operation of a display apparatus according to one or more embodiments of the disclosure.

FIG. 2 is a diagram illustrating an operation of a display apparatus according to one or more embodiments of the disclosure. Referring to FIG. 2, when a person 10 is included in an image, brightness of the person 10 may be increased, brightness of a remaining area excluding the person may be decreased, and ambient light may be provided.

In the case of the various embodiments described above, in that brightness of a specific object included in an image is increased and thus is different from high dynamic range (HDR) driving in which a contrast ratio of an image is simply maximized by expressing a bright portion to be brighter and a dark portion to be darker.

Figure 3:
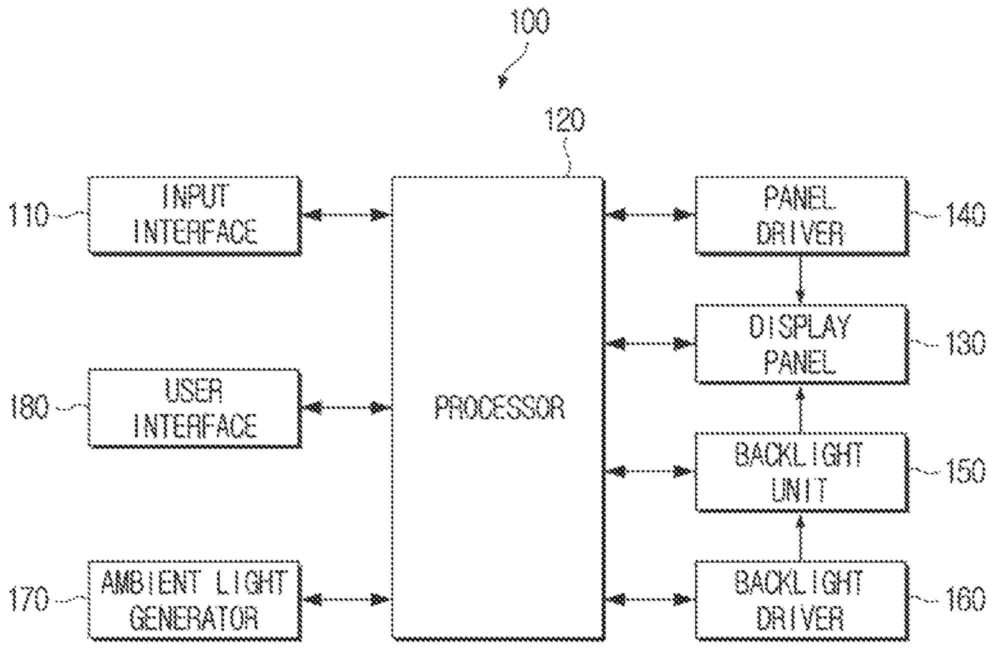
FIG. 3 is a block diagram of a display apparatus according to one or more embodiments of the disclosure.

FIG. 3 is a block diagram of a display apparatus according to one or more embodiments of the disclosure. FIG. 3 collectively illustrates various components that may be included in the display apparatus 100. Therefore, according to an embodiment, some of the components illustrated in FIG. 3 may be omitted or changed, and other components may be further added. In describing FIG. 3, descriptions overlapping with those described above will be omitted or shortened.

Referring to FIG. 3, the display apparatus 100 may include the input interface 110, the processor 120, the display panel 130, a panel driver 140, a backlight unit 150, a backlight driver 160, an ambient light generator 170, and a user interface 180.

The panel driver 140 drives the display panel 130 according to control of the processor 120. For this, the panel driver 140 may include at least one driver IC. For example, the panel driver 140 may include a data driver IC to provide video data and a gate driver IC to drive the display panel 130 in a row line unit, but is not limited thereto. According to an embodiment, at least driver IC may be mounted on the display panel 130, or may be mounted on a configuration separate from the display panel 130.

The backlight unit 150 emits light to the display panel 130. In particular, the backlight unit 150 may illuminate the display panel 130 with light on a rear surface of the display panel 130, that is, an opposite surface where an image is displayed.

The backlight unit 150 may include a plurality of light sources and the plurality of light sources may include a linear light source like a lamp or a point light source light a light emitting diode, but is not limited thereto. The backlight unit 150 may be implemented as a direct type backlight unit or an edge type backlight unit. The light source of the backlight unit 150 may include one or two or more light sources among a light emitting diode (LED), a hot cathode fluorescent lamp (HCFL), a cold cathode fluorescent lamp (CCFL), an external electrode fluorescent lamp (EFEL), an ELP, and FFL, but is not limited thereto.

According to one or more embodiments, the backlight unit 150 may be implemented with a plurality of backlight blocks, a plurality of LED modules and/or a plurality of LED cabinets. In addition, the backlight block may include a plurality of LED pixels. At this time, the LED pixel may be implemented with a blue LED or a white LED, but is not limited thereto and may be implemented in a format to include at least one of red LED, green LED, or blue LED.

Figure 4:
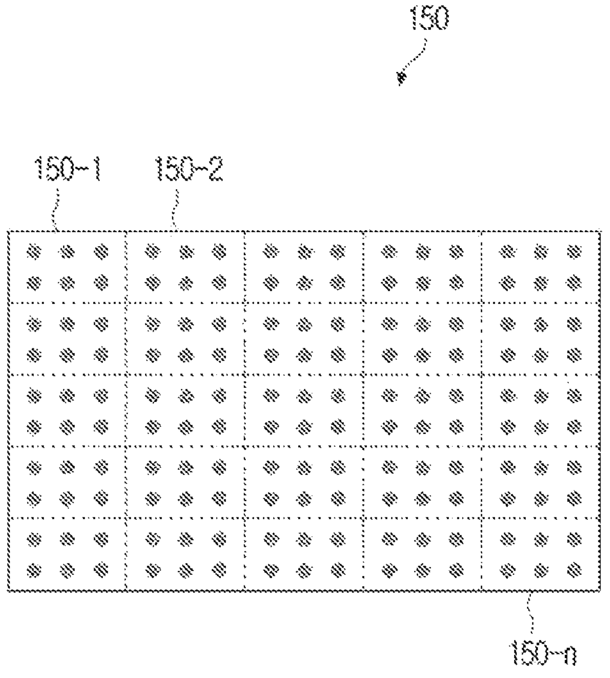
FIG. 4 is a diagram illustrating a backlight unit according to one or more embodiments of the disclosure.

FIG. 4 illustrates a backlight unit according to one or more embodiments of the disclosure. Referring to FIG. 4, the backlight unit 150 includes a plurality of backlight blocks 150-1, 150-2, . . . , **150-*n***, and each of the backlight blocks includes six light sources. The number of light sources included in each backlight block being six is merely an example, and each backlight block may include at least one light source.

According to one or more embodiments, the backlight unit 150 may be implemented as a direct type backlight unit as shown in FIG. 4. For example, the direct type backlight unit may be implemented in a structure in which a plurality of optical sheets and a diffuser plate are stacked on a lower portion of the display panel 130, and a plurality of light sources are disposed under the diffuser plate.

According to another embodiment, the backlight unit 150 may be implemented as an edge type backlight unit. For example, the edge type backlight unit may be implemented in a structure in which a plurality of optical sheets and a light guide plate are stacked on a lower portion of the display panel 130, and a plurality of light sources are disposed on a side surface of the light guide plate. The edge type backlight unit may be divided into a plurality of backlight blocks based on an arrangement structure of a plurality of light sources.

The processor 130 may identify a plurality of screen areas which may be separately controlled according to an implementation form of the backlight unit 150, and control the display panel 130 in a local dimming method for individually controlling the backlight blocks for each area. That is, the processor 130 may adjust dimming values for each of a plurality of backlight blocks 150-1, 150-2, . . . , **150-*n*. Accordingly, the intensity of light irradiated from the backlight unit 150 to the display panel 130 may be controlled by backlight blocks 150-1, 150-2, . . . , 150-*n*, and the brightness of the image displayed on the display panel 130 may also be controlled according to each backlight block 150-1, 150-2, . . . , 150-*n***.

Therefore, the processor 120 may increase brightness of a specific object by adjusting a dimming value of an area of the display panel 130 corresponding to the identified specific object in an image or may decrease brightness of a specific object by adjusting a dimming value of a remaining area.

The backlight driver 160 may drive the backlight unit 150 by the control of the processor 120. For this, the backlight driver 160 may include a driver IC for driving the backlight unit 150. For example, when the light sources included in the backlight unit 150 are implemented as LED devices, the driver IC may be implemented with at least one LED driver that controls a current applied to the LED. At this time, the LED driver may be disposed at the rear end of a power supply (for example, a switching mode power supply (SMPS)) to receive a voltage from the power supply. Alternatively, an LED driver may receive voltage from a separate power supply device. Alternatively, it is also possible that the SMPS and LED drivers are implemented in one integrated module. Therefore, the processor 120 may control the operation of the backlight unit 150 by controlling the backlight driver 160.

In the meantime, the backlight driver 160 may be included in the display panel 130 according to an embodiment, and may be implemented in a system on chip (SoC) along with the processor 120 separate from the display panel 130.

Figure 5:
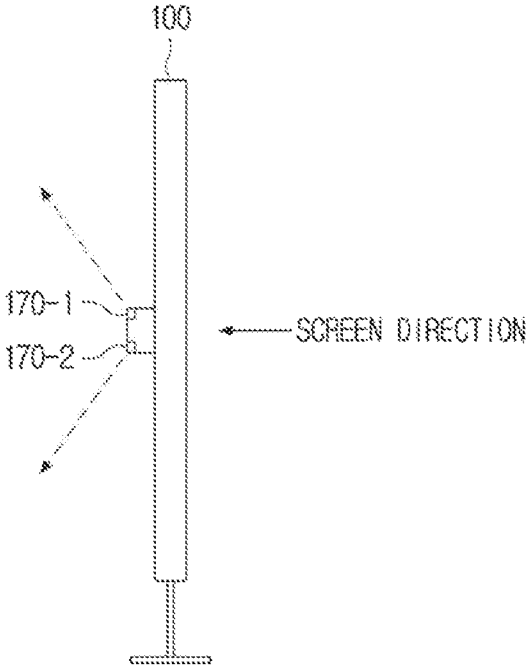
FIG. 5 is a diagram illustrating an ambient light generator according to one or more embodiments of the disclosure.

The ambient light generator 170 may generate ambient light that illuminates the periphery of the display apparatus 100. For this, the ambient light generator 170 may include at least one of a red LED, a green LED, and a blue LED, and may be disposed on a rear surface or a side surface of the display apparatus 100. Although FIG. 5 illustrates an example in which the ambient light generators 170-1 and 170-2 are disposed on the rear surface of the display apparatus 100, that is, on the opposite surface of the screen, but embodiments are not limited thereto, and according to an embodiment, all and a part of the ambient light generator 170 may be disposed on the side surface of the display apparatus 100.

The processor 120 may control the ambient light generator to generate ambient light in response to identification of a specific object. For example, the processor 120 may, in response to identification of a specific object, control at least one of a red LED, a green LED, or a blue LED so that ambient light of a preset color flickers.

According to an embodiment, the display apparatus 100 may include a separate control IC to drive the ambient light generator 170, but is not limited thereto.

The user interface 180 is an element to receive various user commands. For this, the user interface 180 may include various buttons, touch panel, and a touch screen, and a user may input a user command to the display apparatus 100 through the user interface 180.

In particular, according to one or more embodiments of the disclosure, a user may input a user command to set an operation mode of the display apparatus 100 through the user interface 180, and the processor 120 may operate according to a set operation mode.

For example, if an operation mode of the display apparatus 100 is set to be the first operation mode through the user interface 180, the processor 120 may adjust a dimming value of an area of the display panel 130 corresponding to a specific object so that brightness of a specific object increases, and may control the display panel 130 to display an image based on the adjusted dimming value.

When an operation mode of the display apparatus 100 is set to a second operation mode through the user interface 180, the processor 120 may adjust a diming value of an area of the display panel 130 corresponding to the specific object so that brightness of the specific object is increased, adjust a diming value of an area of the display panel 130 corresponding to the remaining area so that brightness of the remaining area other than the specific object on the image is decreased and may control the display panel 130 to display the image based on the adjusted dimming value.

In addition, when the operation mode of the display apparatus 100 is set to a third operation mode through the user interface 180, the processor 120 may control the ambient light generator 170 to generate the ambient light in response to the identification of the specific object in addition to the operation such as the operation in the second operation mode.

Figure 6:
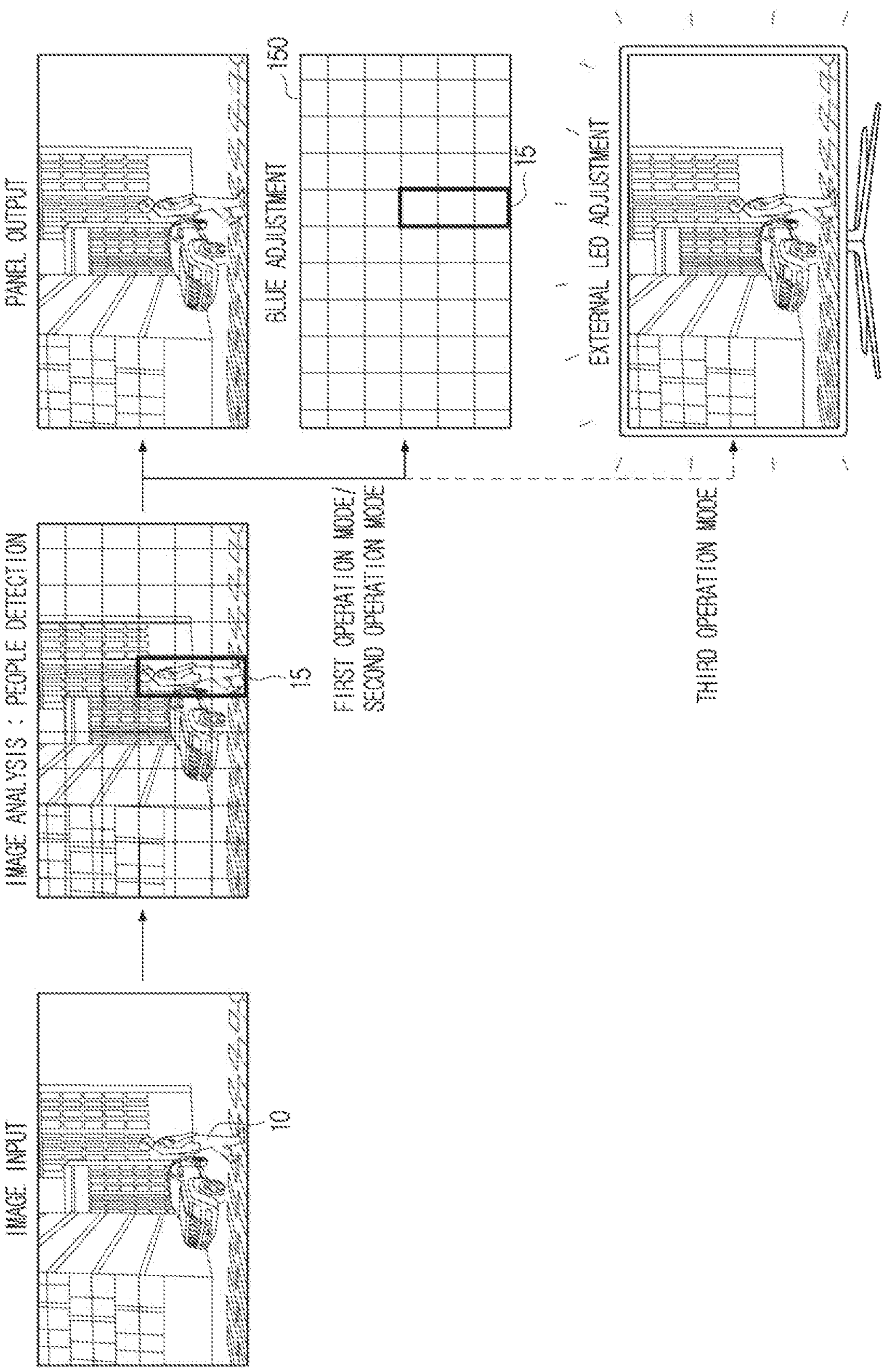
FIG. 6 is a diagram illustrating an operation of a display apparatus according to one or more embodiments of the disclosure.

FIG. 6 is a diagram illustrating an operation of the display apparatus 100 according to one or more embodiments of the disclosure.

Referring to FIG. 6, when an image is input through the input interface 110 in a state in which an operation mode of the display apparatus 100 is set to a first operation mode (for example, a normal mode), the processor 120 may identify a specific object included in the image by analyzing the input image (in FIG. 6, identify the person 10 in an image through a people detection operation using HOG) and may identify a coordinate 15 of the display panel 130 corresponding to the identified specific object. The identified coordinates of the display panel 130 may be a location of the backlight unit 150 corresponding to an area of the display panel 130 on which a specific object is to be displayed.

Accordingly, the processor 120 may enable a specific object to be expressed brighter than original brightness through local dimming (that is, by adjusting a dimming value of the area 15 of the display panel 130 corresponding to a specific object to be brighter than an original brightness).

In the meantime, if an image is input through the input interface 110 in a state in which the operation mode of the display apparatus 100 is set to a second operation mode (for example, a high mode), the processor 120, in addition to adjusting the dimming value of the area 15 of a specific object to be bright, may adjust the dimming value of the remaining area other than the area 15 of the specific object to be darker than the original brightness, in order to relatively further emphasize the specific object.

The original dimming value may be, when the display apparatus 100 is not operated in a first operation mode or a second operation mode, a dimming value determined to display an input image, and a degree of adjusting a dimming value may be experimentally determined by a manufacturer or a developer of the display apparatus 100.

In the meantime, if an image is input to through the input interface 110 when an operation mode of the display apparatus 100 is set to a third mode (e.g., extreme mode), the processor 120 may generate ambient light in addition to the operation of the second operation mode. For example, in a time point at which the person 10 is identified in the input image, the processor 120 may control an external LED so that an external LED (that is, ambient light generator 170) flickers in a designated color (e.g., red).

In the meantime, the display apparatus 100 may include a storage (not shown). The storage may store data necessary for an operation of the display apparatus 100.

For this, the storage (not shown) may store data necessary for the processor 120 to execute various processing. For example, the storage (not shown) may be implemented as an internal memory such as the read-only memory (ROM), random access memory (RAM), or the like, included in the processor 120, or a memory separate from the processor 120.

In the meantime, the storage (not shown) may be implemented as a memory type embedded in the display apparatus 100 according to a data storage use, or a memory type detachable from the display apparatus 100. For example, the data for driving the display apparatus 100 may be stored in a memory embedded in the display apparatus 100, and the data for expansion of the display apparatus 100 may be stored in a memory detachable from the display apparatus 100.

The memory embedded in the display apparatus 100 may be implemented as a format such as a non-volatile memory, a volatile memory, a flash memory, a hard disk drive (HDD) or a solid state drive (SSD), or the like, and a memory detachable from the display apparatus 100 may be implemented as a format such as a memory card (for example, a micro secure digital (SD) card, a universal serial bus (USB) memory, or the like), an external memory connectable to the USB port (for example, USB memory), or the like.

In addition, the display apparatus 100 may include a communicator (not shown). The communicator (not shown) may communicate with various external devices according to various types of communication methods.

For this, the communicator (not shown) may include a wired LAN communication module like Ethernet module. In addition, the communicator (not shown) may include a wireless LAN communication module like Wi-Fi communication module. The communicator (not shown) may include a near field wireless communication module or a mobile communication module according to an embodiment. The near field wireless communication module may refer to, for example, a communication module that performs data communication wirelessly with an electronic apparatus located nearby, like a Bluetooth module, a ZigBee module, a Near Field Communication (NFC) module, or the like. In addition, the mobile communication module may refer to a communication module that performs communication by accessing various mobile communication standards like 3rd Generation (3G), 3rd Generation Partnership Project (3GPP), Long Term Evolution (LTE), or the like.

According to an embodiment, a communicator (not shown) may include a broadcasting reception module, and may include at least one of wired communication modules including Universal Serial Bus (USB), Institute of Electrical and Electronics Engineers (IEEE) 1394, recommended standard 232 (RS-232), HDMI (High Definition Multimedia Interface (HDMI), or the like.

Figure 7:
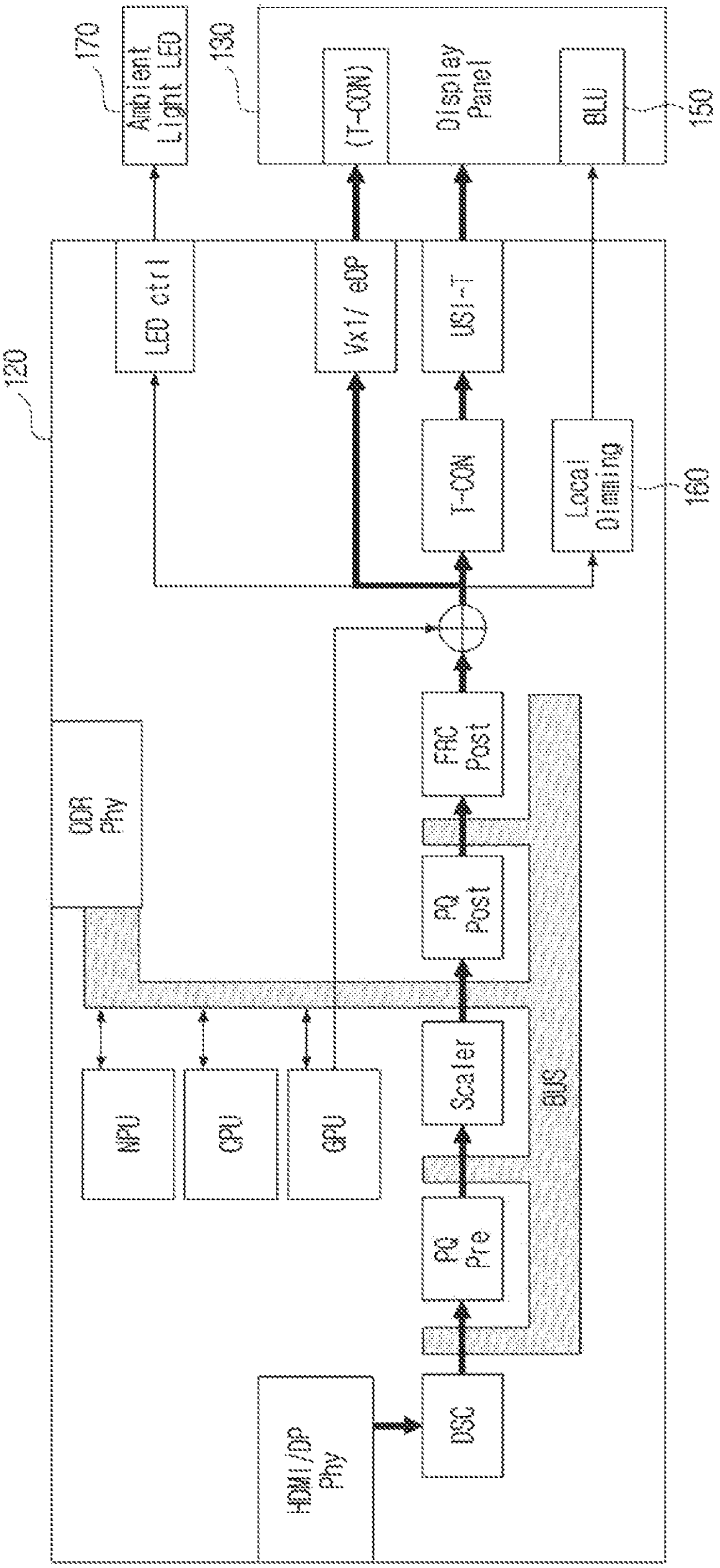
FIG. 7 is a block diagram of a display apparatus according to one or more embodiments of the disclosure.

FIG. 7 is a block diagram of a display apparatus according to one or more embodiments of the disclosure. In FIG. 7, reference numeral 120 illustrates an SoC including various processors or driver IC. In the meantime, the ambient light LED may correspond to the ambient light generator 170 described above, the BLU may correspond to the backlight unit 150, and local dimming may correspond to the backlight driver 160.

Referring to FIG. 7, the image signal input through the input interface 110 may pass through High Definition Multimedia Interface (HDMI)/Display Port (DP) phy, and if there is Display Stream Compression (DSC), decoding is performed in the DSC.

Thereafter, a screen ratio is set through a scaler after pre picture quality (PQ) setting and then post PQ setting is performed. Then, the image signal may be transmitted to T-CON or high-speed interface (V-by-One (V×1)/embedded Display Port (eDP)) for inputting T-CON, and may be output through the display panel 130.

According to one or more embodiments of the disclosure, as described above, the display apparatus 100 may identify a specific object according to an image analysis result, and perform a dimming operation of the BLU 150 or an ambient light LED 170 providing operation, to emphasize the identified specific object.

In the meantime, referring to FIG. 7, the SoC 120 includes an NPU. Since the NPU is a processor designed to efficiently process an artificial intelligence calculation through an artificial neural network, an artificial intelligence calculation performed through data communication with a conventional cloud server may be efficiently performed in the display apparatus 100.

Therefore, according to one or more embodiments of the disclosure, when identifying a particular object within an image, the NPU may be used. Image analysis using an artificial neural network may be efficiently performed without unnecessary communication with an external server for artificial intelligence calculation.

Figure 8:
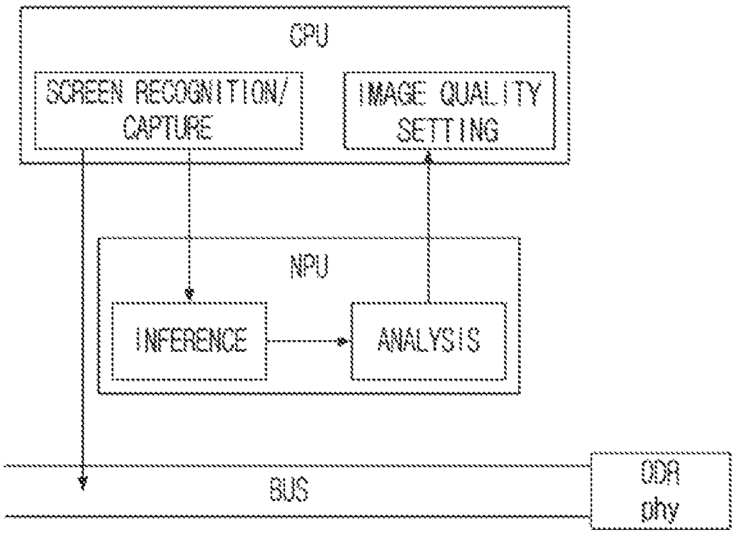
FIG. 8 is a diagram illustrating an operation of a neural processing unit (NPU) according to one or more embodiments of the disclosure.

FIG. 8 is a diagram illustrating an operation of a neural processing unit (NPU) according to one or more embodiments of the disclosure. Referring to FIG. 8, the CPU in the SoC 120 recognizes/captures an input image existing in the BUS and provides the same to the NPU. The NPU infers/analyzes the provided image and provides the result to the CPU, and the CPU performs an image quality setting operation based on the analysis result.

Figure 9:
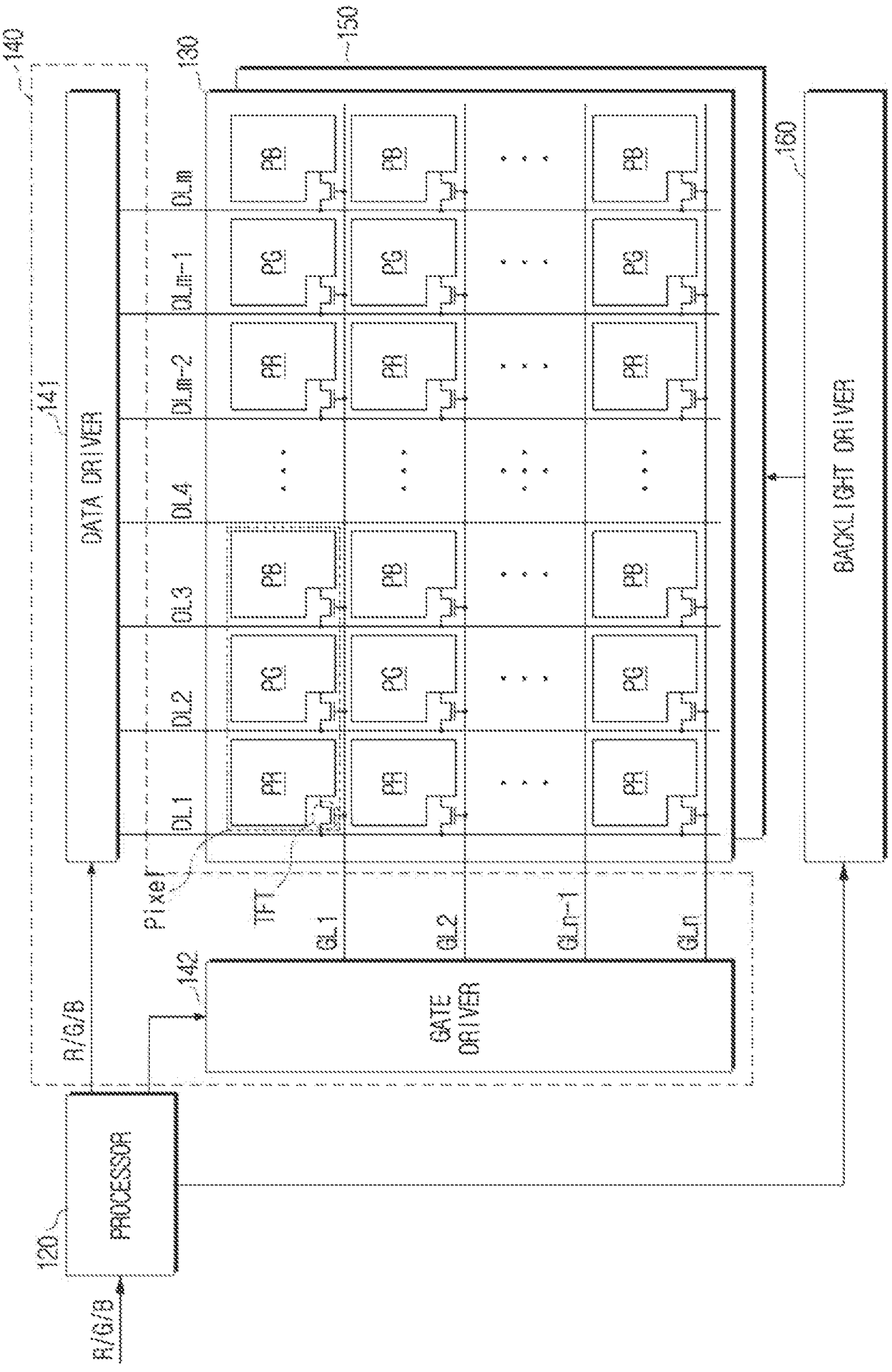
FIG. 9 is a detailed block diagram of a display apparatus according to one or more embodiments of the disclosure.

FIG. 9 is a detailed block diagram of a display apparatus according to one or more embodiments of the disclosure.

Referring to FIG. 9, the display apparatus 100 includes the display panel 130, a backlight unit 150, the processor 120, a backlight driver 160, and a panel driver 140. Among the configurations illustrated in FIG. 9, those overlapping with the configurations of FIG. 3 will not be described.

The display panel 130 is formed such that the gate lines GL1 to GLn and the data lines DL1 to DLm cross each other, and R, G, B sub-pixels PR, PG, PB are formed at the area provided by the cross. The adjacent R, G, B sub-pixels PR, PG, PB form one pixel. That is, each pixel reproduces color of the subject with three primary colors of red R, green G, and blue B including R subpixel PR representing red R, G subpixel PG representing green G, and B subpixel PB representing blue B.

When the display panel 130 is implemented as an LCD panel, each subpixel PR, PG, and PB may include a pixel electrode and a common electrode, and the light transmittance is changed while the liquid crystal alignment is changed to the electric field formed with the potential difference between both electrodes. TFTs formed at a cross portion of gate lines (GL1 to GLn) and data lines (DL1 to DLm) supply video data from data lines (DL1 to DLm), that is, R, G, and B data, to pixel electrodes of each subpixel PR, PG, and PB, in response to scan pulse from each gate line (GL1 to GLn).

The panel driver 140 may include a data driver 141 and a gate driver 142. The data driver 141 is a means for generating a data signal, and generates a data signal by receiving image data of R/G/B from the processor 120 (or timing controller (not shown)). Also, the data driver 141 may apply, to the display panel 130, the data signal that is generated through connection to the data lines (DL1, DL2, DL3, . . . , DLm) of the display panel 130.

The gate driver 142 (or scan driver) is a means for generating a gate signal (or a scan signal), which is connected to the gate lines (GL1, GL2, GL3, . . . , GLn) and transfers the gate signal to a specific row of the display panel 130. To a pixel to which the gate signal is transferred, a data signal output from the data driver 141 is transferred.

The panel driver 140 may further include a timing controller (not shown). The timing controller (not shown) may receive an input signal IS, a horizontal synchronizing signal Hsync, a vertical synchronizing signal Vsync, and a main clock signal MCLK, or the like, from the outside, for example, the processor 120, generate an image data signal, a light emission control signal, a data control signal, an emission control signal, or the like, and provide the signals to the display panel 130, the data driver 141, the gate driver 142, or the like.

Figure 10:
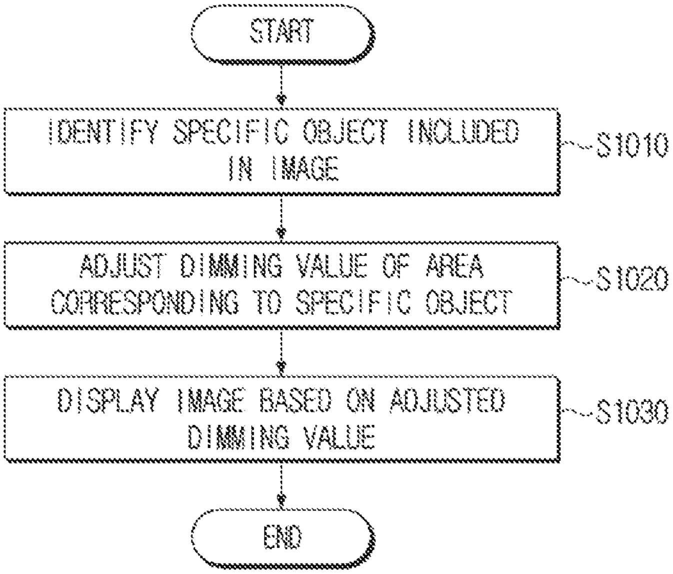
FIG. 10 is a flowchart of a controlling method of a display apparatus according to one or more embodiments of the disclosure.

FIG. 10 is a flowchart of a method for controlling a display apparatus according to one or more embodiments of the disclosure. Referring to FIG. 10, the display apparatus 100 may identify a specific object included in an image corresponding to an input image signal in operation S1010. The display apparatus 100 may include a neural processing unit (NPU), and may identify a specific object in the image by using the NPU, but is not limited thereto.

Thereafter, the display apparatus 100 may adjust a dimming value of the area of the display panel 130 corresponding to the specific object so that brightness of the identified specific object is increased in operation S1020.

In addition, the display apparatus 100 may adjust a dimming value of the area of the display panel corresponding to the remaining area so that brightness of a remaining area other than the specific object in the image is decreased.

Accordingly, the display apparatus 100 may display an image on the display panel 130 based on the adjusted dimming value in operation S1030.

In the meantime, in response to identification of a specific object, the display apparatus 100 may generate ambient light which lights up the periphery of the display apparatus. At this time, a red light emitting diode (LED), a green LED, and a blue LED may be disposed on a rear surface or a side surface of the display apparatus 100, and in response to identification of the specific object, the red LED, green LED, and blue LED may be controlled so that an ambient light of a preset color flickers.

In the meantime, according to one or more embodiments of the disclosure, the operations of the display apparatus 100 described above may be performed according to an operation mode of the display apparatus 100 set by a user.

For example, when the operation mode of the display apparatus 100 is set to the first operation m ode, the display apparatus 100 may adjust a dimming value of an area of the display panel 130 corresponding to the specific object so that brightness of the specific object is increased.

In addition, when the operation mode of the display apparatus 100 is set to the second operation mode, the display apparatus 100 may adjust the dimming value for the area of the display panel 130 corresponding to the specific object so that the brightness of the specific object increases, and adjust the dimming value for the area of the display panel 130 corresponding to the remaining area so that the brightness of the remaining area excluding the specific object is decreased in the image.

In addition, the display apparatus 100 may, when the operation mode of the display apparatus 100 is set to the third operation mode, adjust a dimming value of the area of the display panel 130 corresponding to the specific object so that brightness of the specific object is increased, adjust a diming value of an area of the display panel 130 corresponding to a remaining area so that brightness of a remaining area other than the specific object in an image is decreased, and generate ambient light which lights up the periphery of the display apparatus 100 in response to the identification of a specific object.

At this time, according to one or more embodiments, the image input to the display apparatus 100 may be a game image, and the identified specific object may be a person included in the game image, but is not limited thereto.

In the meantime, according to one or more embodiments of the disclosure, the display apparatus 100 may include the backlight unit 150 including a plurality of backlight blocks illuminating the display panel 130 with light. The display apparatus 100 may adjust the dimming value of the backlight block corresponding to the area of the display panel 130 on which the specific object is to be displayed, among the plurality of backlight blocks, so that brightness of a specific object increases.

Hereinabove, the display apparatus 100 including the backlight unit 150 and the backlight driver 160 has been mainly described with an example. Representatively, the display apparatus 100 including an LCD may be an example but embodiments are not limited thereto.

That is, for example, in the case of the display apparatus 100 including the display panel 130 in which each sub-pixel is implemented as self-emissive elements, the backlight unit 150 and the backlight driver 160 are not necessary. However, the embodiments described above are applicable.

To be specific, in the case of a self-emissive display, dimming is possible by pixels (or sub-pixels), so the aforementioned various embodiments may be implemented in the same manner, by adjusting, by the processor 120, the dimming value of the self-emissive elements corresponding to the area of the display panel 130 on which the identified specific object is to be displayed to be brighter than the original value, and adjusting a dimming value of self-emissive elements corresponding to the remaining area to be darker than the original value.

According to various embodiments of the disclosure above, an additional image quality mode that may give a user using gaming contents a sense of engagement may be provided. Accordingly, convenience of a user for use of the gaming contents may be improved.

A problem that each display module 130-1 to 130-12 of the modular display panel 500 is sequentially turned on may be solved without increase in hardware complexity or delay in screen display.

One or more embodiments of the disclosure may be implemented in software, including instructions stored on machine-readable storage media readable by a machine (e.g., a computer). An apparatus may call instructions from the storage medium, and execute the called instruction, including the display apparatus 100 according to the disclosed embodiments.

When the instructions are executed by various processors (scaler and timing controller described above may also be a processor), the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

The above description is merely illustrative of the technical idea of the disclosure, and various modifications and variations are possible without departing from the essential characteristics of the disclosure. In addition, the embodiments according to the disclosure are not intended to limit the technical idea of the disclosure, but the scope of the technical idea of the disclosure is not limited by the embodiments. Therefore, the protection scope of the disclosure should be interpreted by the following claims, and all the technical ideas within the equivalent scope thereof should be construed as being included in the scope of the disclosure.

What is claimed is:

1. A display apparatus comprising:

an input interface configured to receive an image signal;

a display panel;

at least one memory configured to store instructions;

an ambient light generator configured to generate ambient light to light up a periphery of the display apparatus; and at least one processor, wherein the instructions, when executed by the at least one processor, cause the display apparatus to:

identify an object included in an image corresponding to the image signal;

adjust a dimming value of an area of the display panel corresponding to the object so that a brightness of the object is increased;

control the display panel to display the image based on the adjusted dimming value; and based on identifying the object, control the ambient light generator to generate the ambient light.

2. The display apparatus of claim 1, wherein the at least one processor comprises a neural processing unit (NPU) and the instructions, when executed by the at least one processor, cause the display apparatus to identify the object on the image by using the NPU.

3. The display apparatus of claim 1, wherein the instructions, when executed by the at least one processor, cause the display apparatus to adjust a dimming value of the area of the display panel corresponding to the remaining area so that a brightness of a remaining area other than the object in the image is decreased.

4. The display apparatus of claim 1, wherein the ambient light generator comprises a red light emitting diode (LED), a green LED, and a blue LED, and is disposed on a rear surface or a side surface of the display apparatus, wherein the instructions, when executed by the at least one processor, cause the display apparatus to, based on the identifying the object, control the red LED, the green LED, and the blue LED so that an ambient light of a preset color flickers.

5. The display apparatus of claim 1, further comprising:

a user interface configured to receive a user command to set an operation mode of the display apparatus, wherein the instructions, when executed by the at least one processor, cause the display apparatus to:

based on an operation mode of the display apparatus being set to a first operation mode through the user interface, adjust a dimming value of the area of the display panel corresponding to the object so that the brightness of the object is increased, based on an operation mode of the display apparatus being set to a second operation mode through the user interface, adjust the dimming value of the area of the display panel corresponding to the object so that the brightness of the object is increased, and adjust a dimming value of an area of the display panel corresponding to a remaining area so that a brightness of the remaining area other than the object in the image is decreased, based on an operation mode of the display apparatus being set to a third operation mode through the user interface, adjust the dimming value of the area of the display panel corresponding to the object so that the brightness of the object is increased, and adjust the dimming value of the area of the display panel corresponding to the remaining area so that the brightness of the remaining area other than the object in the image is decreased, and control the ambient light generator to generate the ambient light in response to identification of the object.

6. The display apparatus of claim 1, wherein the image is a game image, and wherein the object is a person included in the game image.

7. The display apparatus of claim 1, comprising:

a backlight unit comprising a plurality of backlight blocks configured to illuminate the display panel with light, wherein the instructions, when executed by the at least one processor, cause the display apparatus to execute the instructions to adjust a dimming value of a backlight block corresponding to an area of the display panel on which the object is to be displayed among the plurality of backlight blocks so that the brightness of the object is increased.

8. The display apparatus of claim 1, wherein each subpixel of the display panel comprises a self-emissive element, and wherein the instructions, when executed by the at least one processor, cause the display apparatus to adjust a dimming value of self-emissive elements corresponding to the area of the display panel on which the object is to be displayed so that the brightness of the object is increased.

9. A controlling method of a display apparatus, the controlling method comprising:

identifying an object included in an image corresponding to an input image signal;

adjusting a diming value of an area of the display panel corresponding to the object so that a brightness of the object is increased;

displaying the image on a display panel based on the adjusted dimming value; and based on identifying the object, generating ambient light to light up periphery of the display apparatus.

10. The controlling method of claim 9, wherein the display apparatus comprises a neural processing unit (NPU) and wherein the identifying comprises identifying the object on the image by using the NPU.

11. The controlling method of claim 9, further comprising:

adjusting a dimming value of the area of the display panel corresponding to the remaining area so that a brightness of a remaining area other than the object in the image is decreased.

12. The controlling method of claim 9, wherein the display apparatus comprises a red light emitting diode (LED), a green LED, and a blue LED, and the red LED, the green LED, and the blue LED are disposed on a rear surface or a side surface of the display apparatus, wherein the generating the ambient light comprises:

based on the identifying the object, controlling the red LED, the green LED, and the blue LED so that the ambient light of the preset color flickers.

13. A non-transitory computer readable medium storing computer instructions to cause a display apparatus to perform, when executed by a processor of the display apparatus, operations comprising:

identifying an object included in an image corresponding to an input image signal;

adjusting a diming value of an area of a display panel corresponding to the object so that brightness of the object is increased;

displaying the image on the display panel based on the adjusted dimming value; and based on identifying the object, generating ambient light to light up periphery of the display apparatus.

14. A display apparatus comprising:

at least one memory configured to store instructions;

an ambient light generator configured to generate ambient light to light up a periphery of the display apparatus; and at least one processor, wherein the instructions, when executed by the at least one processor, cause the display apparatus to:

identify an object included in an image corresponding to an image signal, adjust a diming value of an area of the display panel corresponding to the object so that a brightness of the object is increased;

control a display panel to display the image based on the adjusted dimming value; and based on identifying the object, control the ambient light generator to generate the ambient light.

15. The display apparatus of claim 14, wherein the at least one processor comprises a neural processing unit (NPU) and the instructions, when executed by the at least one processor, cause the display apparatus to identify the object on the image by using the NPU.

16. The display apparatus of claim 14, wherein the instructions, when executed by the at least one processor, cause the display apparatus to adjust a dimming value of the area of the display panel corresponding to the remaining area so that a brightness of a remaining area other than the object in the image is decreased.

17. The display apparatus of claim 14, wherein the ambient light generator comprises a red light emitting diode (LED), a green LED, and a blue LED, and is disposed on a rear surface or a side surface of the display apparatus, wherein the instructions, when executed by the at least one processor, cause the display apparatus to, based on the identifying the object, control the red LED, the green LED, and the blue LED so that an ambient light of a preset color flickers.

* * * * *